US005989335A

United States Patent [19]
Soroushian et al.

[11] Patent Number: 5,989,335
[45] Date of Patent: *Nov. 23, 1999

[54] DRY DISPERSION OF PLANT PULP IN CONCRETE AND USE THEREOF

[75] Inventors: Parviz Soroushian, 1232 Mizzen Dr., Okemos, Mich. 48864; Jer-Wen Hsu, Okemos, Mich.

[73] Assignee: Parviz Soroushian

[ * ] Notice: This patent is subject to a terminal disclaimer.

[21] Appl. No.: 08/885,644

[22] Filed: Jun. 30, 1997

Related U.S. Application Data

[63] Continuation of application No. 08/558,847, Nov. 15, 1995, Pat. No. 5,643,359.

[51] Int. Cl.$^6$ ............................................... C04B 16/02
[52] U.S. Cl. ............................................. 106/805; 106/731
[58] Field of Search ..................................... 106/731, 805

[56] References Cited

U.S. PATENT DOCUMENTS

| | | | |
|---|---|---|---|
| 3,753,749 | 8/1973 | Nutt | 106/93 |
| 4,369,201 | 1/1983 | Kober | 427/4 |
| 4,400,217 | 8/1983 | Kober | 106/93 |
| 4,985,119 | 1/1991 | Vinson et al. | 162/149 |
| 5,102,596 | 4/1992 | Lempfer et al. | 264/115 |
| 5,643,359 | 7/1997 | Soroushian et al. | 106/805 |

*Primary Examiner*—David Brunsman

[57] ABSTRACT

Pulp fibers derived from wood or non-wood plants or recycled paper products, which are 0.1–30 mm long and about 0.001–0.1 mm in equivalent diameter, are individualized by mechanical action, blended with at least one of the dry ingredients of the cement-based material and then mixed with the remaining ingredients of conventional cement-based mixtures using conventional mixing equipment for effectively improving fresh and hardened properties of cement-based materials. Dispersion is achieved by individualizing the plant pulp fibers by mechanical action, and further by blending the individualized fibers with at least one of the dry ingredients of the mix and then with the remaining ingredients of the cement-based material, with fibers added at relatively low dosages of about 0.3–30 kg per cubic meter. The affinity of plant pulp fibers for water facilitates their dispersion in conventional cement-based mixtures. Fresh mixtures of cement-based materials incorporating the dispersed individualized plant pulp fibers possess desirable workability, resistance to segregation and bleeding, pumpability, finishability, and reduced rebound when pneumatically applied. Hardened cement-based materials incorporating the dispersed individualized plant pulp fibers provide improved crack resistance, toughness characteristics, impact resistance, fatigue life, abrasion resistance, and other mechanical, physical and durability characteristics. Plain and reinforced concrete and shotcrete as well as precast and cast-in-place concrete, plaster and stucco, mortar, grout and flowable fill are examples of cement-based materials which can benefit from the improvements in fresh and hardened material properties rendered by dispersed plant pulp fibers.

29 Claims, No Drawings

DRY DISPERSION OF PLANT PULP IN CONCRETE AND USE THEREOF

CROSS REFERENCES TO RELATED APPLICATIONS

Continuation of Ser. No. 08/558,847, Filed Nov. 15, 1995, now U.S. Pat. No. 5,643,359.

BACKGROUND—FIELD OF INVENTION

This invention relates to brittle matrix composites and plant pulp, and especially to the processing and use of pulp fibers for reinforcing cement-based materials.

STATEMENT AS TO RIGHTS TO INVENTIONS MADE UNDER FEDERALLY-SPONSORED RESEARCH AND DEVELOPMENT

Rights to this invention fully belong to DPD, Inc. of Lansing, Mich.

BACKGROUND—DESCRIPTION OF THE PRIOR ART

The concept of using fibers to improve the behavior of building materials is old; examples include adding straw fibers to sun-dried mud bricks (adobe) and asbestos fibers to pottery, thus creating a composite with a better performance Such performance could be translated in the case of adobe by a better resistance to cracking and a better resistance to fragmentation after cracking induced by repetitive changes in temperature and humidity. It is no surprise that when Portland cement concrete started evolving as a building material, attempts were made to add fibers to it to improve its behavior. Early work in this area in the $19^{th}$ century led to the development of ferrocement and reinforced concrete as known today. However, the use of continuous reinforcement required careful placement and higher labor technical skills, hence higher cost.

The idea of using strong discontinuous fibers as reinforcement for concrete has been a challenge to many civil engineers. Adding the reinforcement to the mixer in the form of fibers, simply like adding aggregates or admixtures, to create a homogeneous, isotropic, and moldable structural material is a dream that started more than a century ago, and is still in the making today. The fibers considered for the reinforcement of concrete include steel, polypropylene, nylon, glass, carbon, kevlar, and natural fibers. A selective number of patens in the field of cellulose fiber reinforced cement-based materials, which is the subject of this invention, is reviewed next. A listing of the references is first presented followed by a brief discussion of same.

U.S. PATENT DOCUMENTS

U.S. Pat. No. 3,753,749 to Nutt (1971)
U.S. Pat. No. 4,369,201 to H. Kober (1983)
U.S. Pat. No. 4,400,217 to H. Kober (1983)
U.S. Pat. No. 4,985,119 to K. D. Vinson and B. J. L. Huff(1991)
U.S. Pat. No. 5,102,596 to Lempfer et al. (1992)

FOREIGN PATENT DOCUMENTS

None.

OTHER PRIOR ART

None.

REVIEW OF THE ABOVE LITERATURE

Modern innovations and commercial activities relevant to plant fiber reinforced cement composites largely focus on the use of softwood kraft pulp as replacement for asbestos in thin cement products. In this application, kraft pulp fibers are used at relatively large volume fractions (about 20%) in cement nurtures with relatively low dosages of very fine aggregates. In order to facilitate the dispersion of such high volume fractions of kraft pulp fibers, excess amounts of water are used in the mix to form a fluid slurry; subsequently, the excess water is removed from the slurry using suction. The production process (refereed to as Hatschek or slurry-dewatering) is highly specialized and is applicable only to controlled production facilities. The end products are in the form of thin-sheet products. U.S. Pat. No. 4,985,119 to K. D. Vinson and B. J. L. Huff (1991) describes a development in the use of softwood kraft pulp in slurry-dewatered thin cement products where the softwood kraft pulp has higher fractions of summerwood fibers than naturally occur in trees in order to provide a higher reinforcement efficiency. U.S. Pat. Nos. 4,369,201 and 4,400,217 to H. Kober (1983) also relate to the use of relatively high volume fractions of plant fibers for the replacement of asbestos in thin cement products manufactured using specialized processing techniques. Another specialized processing of cellulose fiber cement is presented in U.S. Pat. No. 5,102,596 to Lempfer et al. where a milled mixture of cellulose fiber, cement and water is shaped into a mold through pressing. Our invention is distinguished from U.S. Pat. Nos. 4,985,119, 4,369,201 and 4,400,217 because we use: (1) relatively low volume fractions of plant pulp fibers as secondary reinforcement (instead of high volume fractions of fibers as primary reinforcement); (2) conventional concrete mixtures which are built into conventional concrete products such as pavements, floor systems, etc. (instead of mortar mixtures with fine sand or with no sand which are built into thin building products); (3) conventional mixing techniques and equipment where the low intensity of the mixing effort and the shortage of moisture complicate the dispersion of plant pulp fibers (instead of specialized processing techniques such as the slurry-dewatering procedures which make excessive moisture and mixing effort available for the dispersion of fibers).

U.S. Pat. No. 3,753,749 to Nutt (1971) teaches the use of cellulose fibers which have been dried following the common practice of the paper industry relying heavily on pressing, accompanied with heating, to dry the wet pulp into a dense dried pulp with strong fiber-to-fiber bonding. Such strong fiber-to-fiber bonding necessitates the use of intense mechanical action to break the fiber bonds and make somewhat individual fibers available for dispersion in cement-based materials. The intensity of mechanical action in this process of separating fibers from each other causes damage and breakage of fibers which reduce their reinforcement efficiency in cement-based materials. Our invention involves the use of cellulose fibers which have been specially processed to achieve reduced fiber-to-fiber bonding and thus allow separation into substantially individual fibers using lower-intensity mechanical action which reduces the damage and breakage of fibers. More specifically, the wet cellulose pulp is initially dried with less reliance on pressing into fluff pulp. The subsequent mechanical separation of the fluff pulp into substantially individual fibers can be performed using relatively low amounts of mechanical energy and with limited damage to fibers.

OBJECTS OF THE INVENTION

It is therefore an object of our invention to provide procedures for uniform dispersion of plant pulp fibers in conventional concrete mixtures using conventional mixing procedures and equipment.

It is another object and advantage of our invention to provide a low-cost and effective secondary reinforcement system for concrete consisting of relatively low volume fractions of uniformly dispersed plant pulp fibers which are compatible with and develop sufficient bonding to the concrete matrix.

It is a further object and advantage of our invention to provide reinforcing fibers for concrete which desirable fresh mix workability, segregation and bleeding resistance, pumpability, finishability and plastic shrinkage cracking resistance, and reduced rebound when pneumatically applied.

It is yet a further object and advantage of our invention to enhance the drying and thermal shrinkage cracking resistance, impact and abrasion resistance, fire resistance, toughness, and other mechanical physical and durability characteristics of hardened concrete products with dispersed plant pulp fibers at relatively low volume fractions.

Still further objects and advantages will become apparent from a consideration of the ensuing description.

SUMMARY OF THE INVENTION

According to the present invention there is disclosed a method of providing concrete with an effective and low-cost secondary reinforcement system, comprising individualization of untreated or treated pulp fibers of about 0.1–30 mm in length, about 0.001–0.1 mm in diameter and having length-to-diameter ratios of about 30–3000, derived by at least one of chemical, mechanical or thermal means, or combinations thereof from at least one of non-wood plants, softwoods, hardwoods and recycled paper products, with the individualization process accomplished using mechanical action for reducing the bonding between fibers so that they can be dispersed in conventional concrete mixtures using conventional mixing equipment at relatively low dosages of about 0.3–30 kg per cubic meter. The individualized fibers are then mixed with at least one of the dry ingredients of the cement-based material using mechanical action. This dry blend of individualized cellulose fibers with at least one of the mix ingredients is then mixed with the remaining ingredients of the cement-based material. The fresh concrete mixtures incorporating dispersed plant pulp fibers possess desirable workability, resistance to segregation and bleeding, pumpability, finishability, resistance to plastic shrinkage cracking, and reduced rebound when pneumatically applied. The hardened concrete materials incorporating dispersed plant pulp fibers show improvements in cracking resistance, tensile and flexural strength, toughness characteristics, impact resistance, abrasion resistance and other mechanical, physical and durability characteristics when compared with plain concrete. These improvements result from the fine and slender geometry and desirable mechanical, physical and durability characteristics of plant pulp fibers and their compatibility with concrete, and are achieved at relatively low cost due to the cost-competitiveness of plant pulp fibers. Precast and cast-in-place as well as reinforced and plain concrete and shotcrete benefit from such improvements in fresh and hardened material properties.

BRIEF DESCRIPTION OF DRAWINGS

None.

DESCRIPTION OF THE PREFERRED EMBODIMENTS

Plant pulp is derived from wood or non-wood plants through pulping processes which use at least one of mechanical, thermal and chemical processes. Recycled paper is another source of pulp. Conventional pulping processes yield suspensions of pulp fibers at low concentrations in water, which are subsequently dried by the application of pressure and heat. The resulting dried pulp is largely used in paper and absorbent products. Paper products are generally made by individualizing the fibers in water and forming them into the final product. Absorbent products are typically produced by milling of the dried pulp into individual fibers which are formed into the final product.

Cellulose fibers possess desirable properties for the reinforcement of cement-based materials. They offer relatively high levels of tensile strength and elastic modulus with a relatively high ratio of length to equivalent diameter. Cellulose fibers also offer a relatively high fiber count per unit weight—of the order of few million fibers per gram. This high fiber count strongly benefits the reinforcing action of cellulose fibers in cement-based materials if they are uniformly dispersed within the cement-based matrix. The strong tendency of cellulose fibers to develop hydrogen bonding between each other, however, complicates their uniform dispersion in conventional cement-based materials where limited mixing water and energy is available to individualize fibers. One option is to dry the fibers so that the extent of hydrogen bonding between fibers is reduced, and to first individualize the fibers using mechanical action of devices such as hammermills and pin mills, and then blend the individualized fibers with at least one of the dry ingredients of the mix using mechanical effort. The mechanical action for blending the fibers may be in the form of mixing or milling action. This mechanical action may simply separate the fibers or may also impart some fibrillation action which roughens the fiber surfaces and increases their mechanical bond strength to cement-based materials. One option is to combine the steps of individualizing the fibers and blending them with at least one of the dry ingredients of the mix. For example, cellulose fibers could be milled together with cement in order to accomplish both steps of individualizing and blending.

The resulting blend of cellulose fibers with at least one of the dry ingredients of the cement-based material would be added to the remaining ingredients of conventional cement-based materials, at any stage during the mixing process. Such conventional cement-based materials comprise about 0.3–30 kg per cubic meter of cellulose fiber, about 50–1500 kg per cubic meter of cementitious material, about 50–1000 kg per cubic meter of water, and about 100–3600 kg per cubic meter of aggregate, and optionally different chemical, mineral, polymeric and air-entraining admixtures. Such cementitious material is any hydraulic cement, including Portland cement, blended cement, masonry cement, set regulated cement, high-alumina cement, and expansive cement. The aggregates could be natural, crushed stone, or other forms of artificial or natural normal-weight, light-weight or heavy-weight aggregates.

Conventional mixing action of cement-based materials would provide for uniform dispersion of fibers within the material system. Such conventional mixing action may be performed in a rotary drum mixers, pan mixers, mortar mixers, continuous mixers, and ready-mixed concrete trucks; manual mixing is also a possibility. The fibers blend with at least one of the dry mix ingredients and the remaining ingredients of the cement-based material can be added in any sequence to the mix. For example, the fibers blended with at least one of the dry ingredients of the mix could be added to the cement-based material after all other ingredients have been mixed. The addition of fibers followed by the continuation of mixing would uniformly disperse the fibers within the cement-based material.

The fresh cement-based materials incorporating cellulose fibers can be handled, pumped, shot (pneumatically in shotcrete applications), placed, consolidated, finished and cured using the same procedures and equipment applicable to conventional cement-based materials. The fibers mixed with the dry ingredients of the mix could be also applied pneumatically using the dry shotcrete technique. The presence of cellulose fibers in fresh cement-based materials at dosages of about 0.5–5.0 kg per cubic meter benefits certain aspects of the workability of fresh cement-based mixtures, including their finishability and also their resistance to rebound when pneumatically applied.

Curing of cellulose fiber reinforced cement-based materials, by any conventional technique applicable to normal cement-based materials such as moist curing, steam curing, high-pressure steam curing or application of a curing membrane, yields a hardened cellulose fiber reinforced cement-based material. The presence of cellulose fibers in this hardened material causes improvements in microcrack and crack resistance, strength, toughness, impact resistance, abrasion resistance and various aspects of the physical, mechanical and durability characteristics of the cement-based materials. The hydrophobic nature of cellulose fiber surfaces and their potential for hydrogen bonding to cement-based materials benefit their reinforcing action in hardened cement-based materials. Cellulose fibers, also being of roughly the same cross-sectional dimensions as cement particles, do not interfere with dense packing of cement particles; this favors the microstructural and engineering characteristics of the hardened material.

EXAMPLE 1

We individualized softwood (southern pine) draft pulp in a hammermill, and mixed 120 g of the resulting pulp fibers with 40 kg of Type I Portland cement and 120 kg of natural concrete sand (with 4.75 mm maximum particle size) in a rotary drum mixer for five minutes. Visual inspection of the dry mix revealed a good dispersion of fibers. Subsequently, we added 15 kg of tap water to the dry mix and mixed the material for another three minutes. Companion mixtures were also prepared under similar conditions but without the use of cellulose fibers. We cast the mixtures into prismatic steel molds of 25 mm thickness, 57 mm width and 250 mm length. The mixtures in molds were covered with wet burlap. The specimens were demolded after 24 hours, cured at 100% relative humidity and 20° C. temperature for 14 days and then air-dried until the test age of 28 days. They were then tested in flexure under four-point loading over a span of 171 mm, with loads applied at 57 mm from each end support. The peak load at failure was recorded. Three specimens were tested for each mix. The average peak load for the mix with cellulose fibers corresponded to a stress of 2.3 MPa, compared with 1.7 MPa for the mix without cellulose fibers. Observation of failure surfaces indicated that cellulose fibers were uniformly dispersed in the cement-based material.

We claim:

1. A process of making cellulose fiber reinforced cement-based material using cellulose pulp derived through at least one of mechanical, thermal and chemical pulping methods from at least one of softwood, hardwood, and non-wood plants, the process comprising the steps of:
   a. drying the wet cellulose pulp resulting from the pulping methods under conditions to achieve a dried fluff pulp with low fiber-to-fiber bonding therein;
   b. using mechanical action to break fiber-to-fiber bonds and produce substantially individual fibers;
   c. mixing the dried pulp with at least one of dry ingredients of the cement-based material which include cement, aggregates, and chemical, mineral, polymeric and air-entraining admixtures to produce a premix;
   d. adding the said premix to the remaining ingredients of the cement-based material to reach a fiber dosage ranging from about 0.3–30.0 kg per cubic meter, said cement-based material further including about 50–1500 kg per cubic meter of cementitious material, about 50–1000 kg per cubic meter of water, and about 100–3600 kg per cubic meter of aggregate; and
   e. mixing the cement-based material incorporating fibers so as to disperse the fibers uniformly throughout the cement-based material.

2. The process of claim 1, wherein the fiber dosage ranges form 0.5–5.0 kg of fiber per cubic meter of cement-based material.

3. The process of claim 1, wherein said premix is placed in a container, with the premix and container mixed together with the remaining ingredients of the cement-based material so that the container disintegrates in the cement-based material through at least one of dissolution and dispersion.

4. The process of claim 1, wherein said cement-based material further includes at least one of chemical admixtures, mineral admixtures, polymeric admixtures, and air entraining agents.

5. The process of claim 1, wherein said steps of individualizing the pulp fibers and mixing them with at least one of the dry ingredients of the mix are combined.

6. The process of claim 1, wherein said step of adding the premix to other ingredients involves addition of the premix with other ingredients of the cement-based material at any stage during the mixing step.

7. The process according to claim 1, wherein the mixing of the premix into the cement-based material exceeds 20 seconds.

8. The process according to claim 1, wherein said aggregate of said cement-based material comprises at least one of mineral, synthetic, metallic, and organic sources, with about 0.05–5 mm minimum aggregate particle size and about 10–100 mm maximum aggregate particle size.

9. The process according to claim 1, wherein said mixing of the premix takes place in a conventional mixer type used for mixing of cement-based materials.

10. The process of claim 1, wherein said individualization of fibers takes place using a mill.

11. The process according to claim 1, wherein said individualization of fibers involves impacting the pulp against a solid surface.

12. The process according to claim 1, wherein said mixing of the premix with other ingredients of the cement-based material takes place in air as the premix and the other ingredients travel at a sufficiently high speed.

13. The process of claim 1, wherein the cellulose pulp comprises waste paper products.

14. The process of claim 1, wherein said cement-based material is mortar with maximum aggregate particle size of less than 5 mm.

15. The process of claim 1, wherein said cement-based material is further subjected to at least one of the pumping, casting, consolidating, pneumatic application, finishing, and curing processes.

16. The process of claim 1, wherein said individualized dried fluff pulp fibers are compacted to reduce their volume prior to mixing with at least one of the dry ingredients of cement-based material.

17. The process according to claim 1, wherein said drying step further involves chemically treating the cellulose pulp to produce a dried softened fluff pulp with low fiber-to-fiber bonding therein.

18. The process of claim 17, wherein said chemical treating involves use of at least one of a surfactant, a high bulk additive, and a sizing agent.

19. A fresh concrete mixture incorporating dispersed cellulose pulp fibers, which is workable, pumpable, resistant to segregation and excess bleeding, possesses desirable finishability, and offers resistance to the loss of materials through rebound when pneumatically applied, the concrete mixture comprising:

0.3–30 kg per cubic meter of fibers which have been derived from a wet cellulose pulp dried under conditions to achieve a fluff pulp with reduced fiber-to-fiber bonding therein, individualized by mechanical action and mixed with at least one of the dry ingredients of the cement-based material into a premix;

about 50–1500 kg per cubic meter of cementitious material;

about 50–1000 kg per cubic meter of water;

about 100–3600 kg per cubic meter of aggregate; and wherein the fibers are dispersed uniformly throughout the cement-based material through mixing for a sufficiently long period of time.

20. A fresh concrete mixture according to claim 19, wherein said mixture comprises 0.5–5.0 kg per cubic meter of the substantially individual cellulose fibers.

21. A fresh concrete mixture according to claim 19, further including at least one of chemical admixtures, mineral admixtures, polymeric admixtures, and air-entraining agents.

22. A fresh concrete mixture according to claim 19, wherein said cellulose fibers have been chemically treated by the use of at least one of a surfactant, a high bulk additive, and a sizing agent.

23. A hardened cellulose fiber reinforced cement-based structure comprising:

about 0.3–30 kg per cubic meter of substantially individual cellulose fiber derived by initially drying a wet cellulose pulp under conditions to form a dried fluff pulp having low fiber-to-fiber bonding therein, subsequently individualizing the fibers using mechanical action and mixing the fibers with at least one of the dry ingredients of the cement-based material;

about 50–1500 kg per cubic meter of cement;

about 50–1000 kg per cubic meter of water;

about 100–3600 kg per cubic meter of aggregate; and said cellulose fibers being uniformly dispersed throughout the hardened structure through mixing of the fibers together with the cement, water and aggregate for a sufficient length of time prior to curing.

24. A hardened cellulose fiber reinforced structure according to claim 23, wherein the structure comprises 0.5–5.0 kg per cubic meter of the cellulose fibers.

25. The hardened cellulose fiber reinforced cement structure of claim 23, wherein said cellulose fibers have been derived from at least one of softwood, hardwood, and non-wood plants through at least one of mechanical, thermal, and chemical pulping processes, with lengths ranging from 0.1–30 mm, diameters ranging from 0.001–0.1 mm, and mean length-to-diameter ratios ranging from 30–3000.

26. The hardened cement-based structure according to claim 23, further including at least one of chemical admixtures, mineral admixtures, polymeric admixtures, and air entraining agents.

27. The hardened cement-based structure of claim 23, further including a gas-forming agent and air bubbles therein.

28. The hardened cement-based structure according to claim 23, further including at least one of continuous and discrete reinforcement in addition to the cellulose fibers.

29. The hardened cement-based structure of claim 23, wherein said cellulose fibers have been chemically treated by the use of at least one of a surfactant, a high bulk additive, and a sizing agent.

* * * * *